(12) United States Patent
Reasor et al.

(10) Patent No.: US 7,386,712 B2
(45) Date of Patent: Jun. 10, 2008

(54) FIRMWARE DEVELOPER USER INTERFACE WITH BREAK COMMAND POLLING

(75) Inventors: Jason W. Reasor, Frisco, TX (US); Bradley G. Culter, Dallas, TX (US); Greg Albrecht, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 978 days.

(21) Appl. No.: 10/369,279

(22) Filed: Feb. 17, 2003

(65) Prior Publication Data

US 2004/0162979 A1    Aug. 19, 2004

(51) Int. Cl.
*G06F 9/00* (2006.01)
*G06F 15/177* (2006.01)

(52) U.S. Cl. ............................................. 713/2; 713/1

(58) Field of Classification Search ...................... None
See application file for complete search history.

(56) References Cited

U.S. PATENT DOCUMENTS 4,747,045 A * 5/1988 Harigai et al. ............... 712/207
5,889,978 A   3/1999 Jayakumar
6,463,531 B1* 10/2002 Aguilar et al. ................. 713/2

OTHER PUBLICATIONS

U.S. Appl. No. 10/368,269, Jason Reasor, et al.
U.S. Appl. No. 10/369,280, Jason Reasor, et al.

* cited by examiner

*Primary Examiner*—Rehana Perveen
*Assistant Examiner*—Stefan Stoynov

(57) ABSTRACT

A method for providing a firmware developer user interface in a multi-nodal computer system comprises polling for a break command during boot of a multi-nodal computer system and invoking a firmware developer user interface when the break command is encountered.

26 Claims, 3 Drawing Sheets

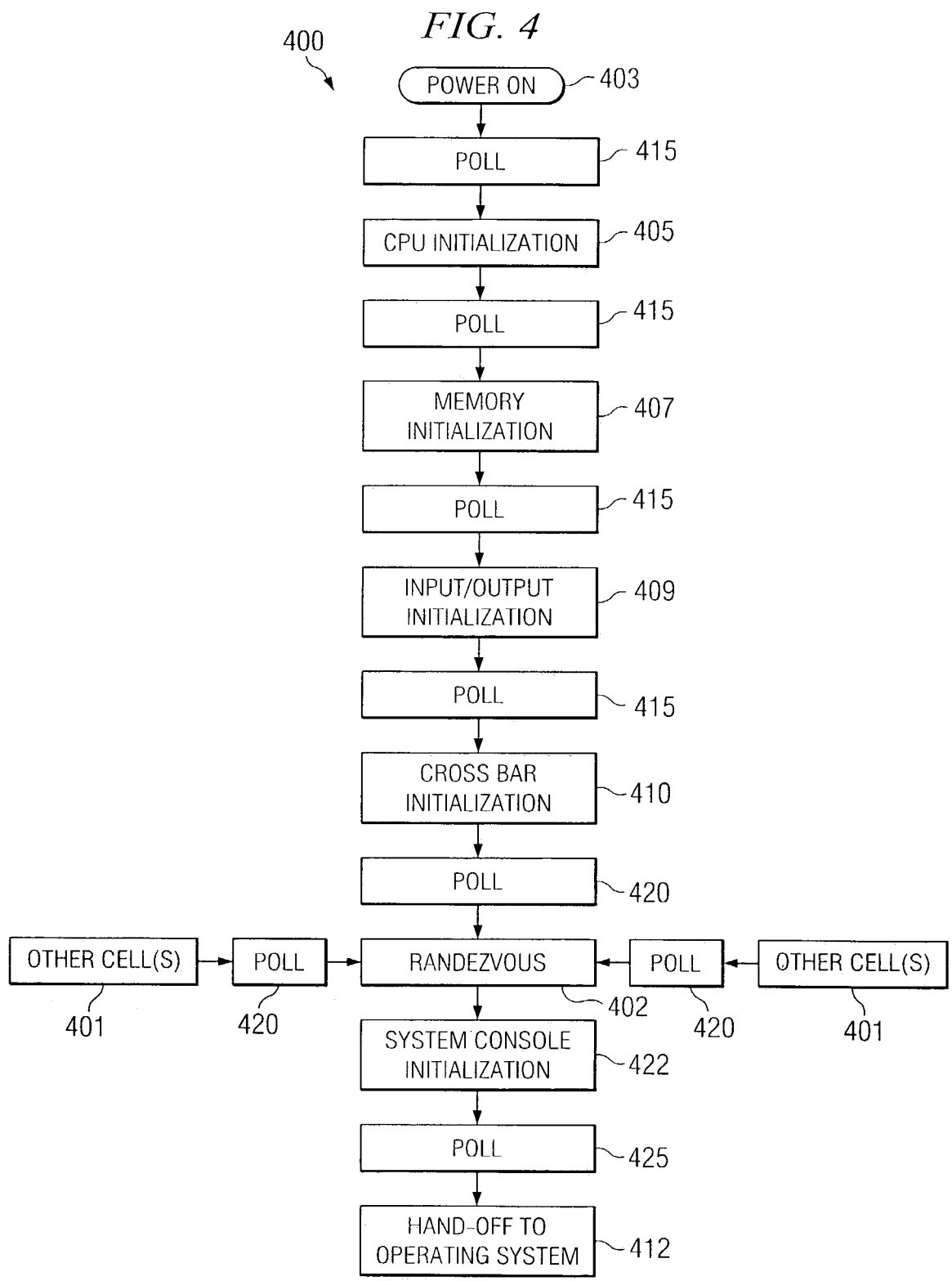

FIRMWARE DEVELOPER USER INTERFACE WITH BREAK COMMAND POLLING

CROSS-REFERENCE TO RELATED APPLICATIONS

The present invention is related to concurrently filed, co-pending and commonly assigned U.S. Published Patent Application number 2004/0162978, published Aug. 19, 2004, entitled "FIRMWARE DEVELOPER USER INTERFACE"; and U.S. Published Patent Application number 2004/0162888, published Aug. 19, 2004, entitled "REMOTE ACCESS TO A FIRMWARE DEVELOPER USER INTERFACE", the disclosures of which are incorporated herein by reference in their entireties.

BACKGROUND

Many failure modes are possible in existing multi-nodal or cellular architecture computer systems. There are failure modes in multi-nodal, computer systems that are not well supported within existing boot or initial program load (IPL) firmware. In such a system, each system cell, or node, boots at a firmware level within the cell. The firmware of each cell then starts communicating with the firmware of other cells, with the goal of making one system, from the server OS's point of view, such that the cells are transparent, externally presenting the system as a single computer. This joining of cells is commonly referred to as rendezvous. Due to some sort of failure, such as a machine check abort (MCA), a cell or multiple cells may not make the rendezvous. In existing systems, that cell, or those cells, reboot and is/are unavailable to the system. In other words, in existing multi-nodal systems, if a cell does not make rendezvous it is left out of the system. As a result, if a particular cell has a resource that the system OS requires, and that cell fails to make rendezvous, the boot of the entire existing multi-nodal system may fail. Such a required resource may be the operating system disk drive, console universal asynchronous receiver/transmitter (UART) connector, local area network (LAN) system boot card, or the like.

Existing firmware user interfaces, designed to be accessed under normal boot conditions and/or from a system-wide perspective, have been implemented, but these interfaces cannot be invoked at the cell level during cell or system boot. Typically, for multi-nodal or cellular architecture server-class computers, when an error state arises during system start-up or boot, an available interactive interface with the system, known as the console, is invoked. Firmware specialist engineers or developers are often involved in the diagnosis of boot-firmware-related problems. However, a firmware specialist or developer is not typically able to gain access to the firmware via this console. In existing multi-nodal computers, firmware runs at a very low level in each node and the console does not allow selective access into the firmware of the cells of the system.

In existing firmware of multi-nodal systems that have an interpreter, it is possible to periodically poll, in the interloop of the interpreter, for a certain escape sequence at the console. However, such an interpreter-based scheme requires that firmware code be rebuilt during every boot calling for an inordinate amount of advance planning to place break points to invoke the console for a cell of a multi-nodal computer system.

Existing interrupt systems call for entering commands at compilation (i.e. anticipating where interrupts are needed) and then hitting the interrupt keys at the right time to catch the interrupt during boot Lip. For example, a particular implementation of an existing firmware console invocation scheme in a Forth-system-based Precision Architecture Reduced Instruction Set Computer (PA-RISC) Open Boot PROM (OBP) firmware system requires storing commands in the nonvolatile random access memory run command (NVRAMRC) file, stored in system nonvolatile random access memory (NVRAM). Forth is a computer programming language used in the OBP system and the IEEE P1275-standard for open firmware. These NVRAMRC stored commands conditionally execute early in bootstrap, prior to activating boot device drivers. This general purpose NVRAMEC file allows insertion of machine-code break points anywhere in the firmware, up to a fixed table limit. Upon encountering the breakpoint, the processor state is saved and the firmware provides an interactive debugger prompt at the system console that has full access to debugger commands as well as all normal Forth system commands. These break points appear to remain persistent across reboots because the commands that insert them into the program text are re-executed on every boot that uses NVRAMRC.

Existing firmware, for example the firmware of multi-node PA-RISC or Scalable Parallel Processor (SPP) based computers, might have interruptible locations polled during bootstrap. These Forth-based capabilities are hidden from end users in the product, but are useful to firmware and kernel developers in the development labs. However, these interruptible locations are not flexible or changeable by a user and are only active momentarily, during a boot sequence. If a user does not interrupt at the right time using an interrupt key, or keystroke combination, the boot firmware flow is never interrupted. Since each node in an SSP has its own NRAMRC, break points may be designated in any node or cell, not just the "monarch" node.

However, existing implementations of firmware consoles have not allowed for robustness in flow of control interruption. Such existing implementations have had the capability to interrupt boot of a cell of a multi-nodal computer system, but not at multiple points on individual cells. These implementations also do not have the ability to set multiple breakpoints that remain pervasive across boots through the setting of an NVRAM variable. Existing solutions do enable setting breakpoint through firmware NVRAM, nor do existing solution enable a nearly infinite number of potential breakpoints through an interrupt keystroke.

SUMMARY

An embodiment of a method for providing a firmware developer user interface in a multi-nodal computer system comprises polling for a break command during boot of a multi-nodal computer system and invoking a firmware developer user interface when the break command is encountered.

An embodiment of a firmware developer user interface for a multi-nodal computer system comprises means for polling for a break command during boot of a multi-nodal computer system, means for receiving a dump of a boot process status of at least one cell of the multi-nodal computer system upon encountering a break command, means for displaying the dump on a console of the system, means for controlling flow of boot of at least one cell of the multi-nodal computer system, and means for directing commands to firmware of at least one cell of the multi-nodal computer system from the console of the multi-nodal system.

An embodiment of a method for providing a firmware developer user interface in a multi-nodal computer system comprises polling for a break command during boot of a cell of a multi-nodal computer system, invoking a firmware developer user interface when the break command is encountered, dumping a processor state for the cell to a console of the cell, and handing-off flow control of the boot of the cell to the developer user interface.

BRIEF DESCRIPTION OF THE DRAWINGS

FIG. 4 is a flow chart of breakpoint polling for interruption of flow control of boot firmware to enable firmware interaction.

DETAILED DESCRIPTION

Figure 1:
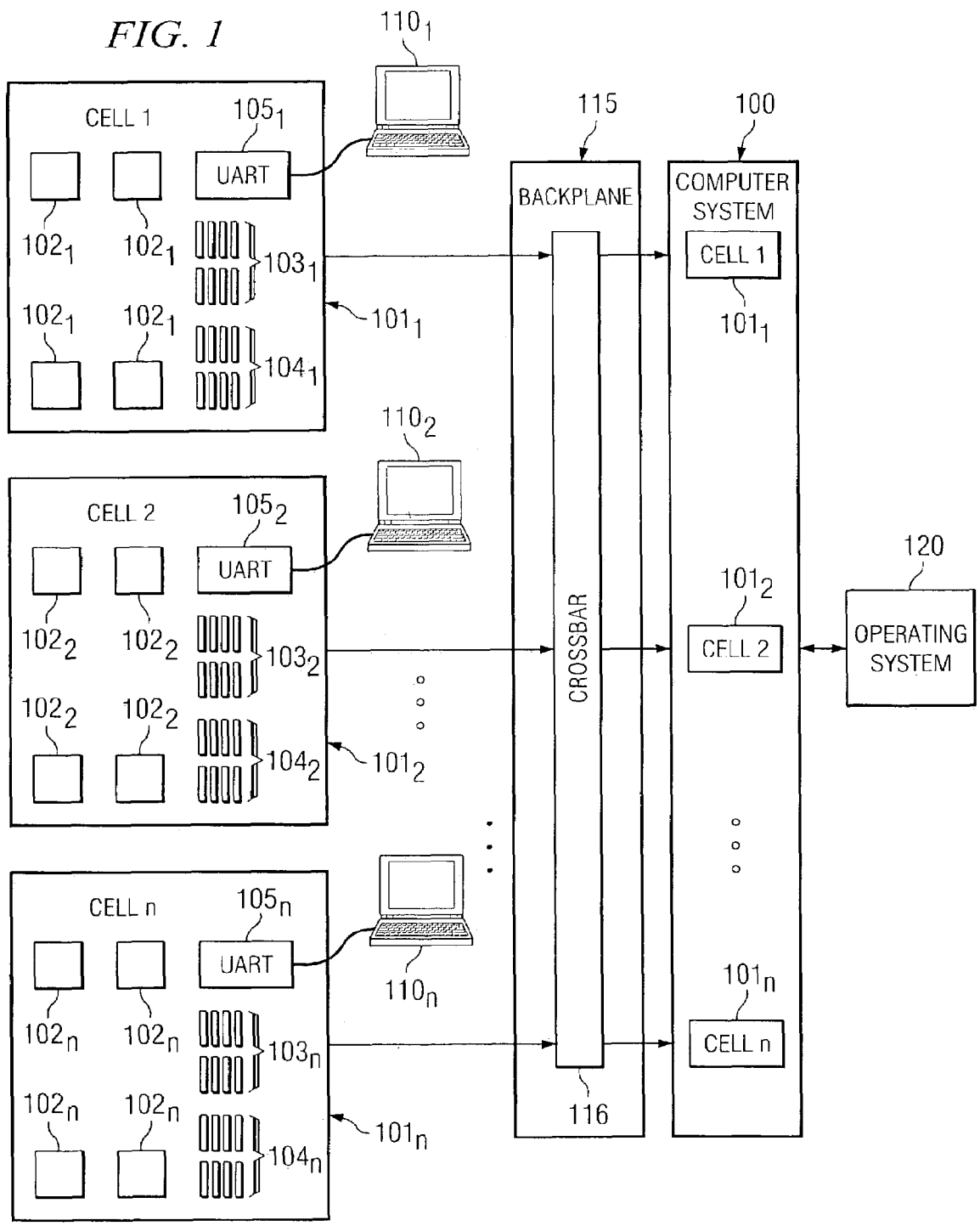
FIG. 1 is a diagrammatic view of an embodiment of a multi-nodal computer system employing a developer user interface.

The present disclosure is, in general, directed to systems and methods for interruption of flow control of boot firmware in a multi-nodal computer system to allow firmware interaction via a developer user interface when called for by an engineer, developer or technician user during system or cell boot. During boot of a cell of a multi-nodal computer system, it is often desirable to halt flow of firmware control in order to debug problems, view system information, or change system configuration. In accordance with one embodiment, the firmware may determine when this transfer of flow of control may occur, but it should be as flexible as possible to support the user's needs. Cell and/or system boot firmware may support an interactive user prompt called a developer's user interface (DUI) disclosed in detail in co-pending, incorporated U.S. patent application Ser. No. [Attorney Docket No. 100111710-1], entitled "FIRMWARE DEVELOPER USER INTERFACE", filed concurrently herewith.

Disclosed embodiments of the DUI invocation systems and methods are particularly well suited for use in an Intel® Itanium™ processor family (IPF) based multi-nodal computer system. However, as one skilled in the art will appreciate, other embodiments of the DUI invocation systems and methods are adaptable for use in any number of multi-nodal computer systems. Also, embodiments of these systems and methods may be implemented across multiple platforms. Additionally, embodiments of the invocation systems and methods may provide interactive initiation control enabling interaction with the DUI while the system or cell is still booting.

It is important for a firmware engineer or developer to have access to appropriate information in order to diagnose boot firmware problems and to take action accordingly. In embodiments of the invocation systems and methods this is accomplished by passing flow of control to a low-level firmware DUI upon encountering a breakpoint or a boot interrupt keystroke during a cell or system boot in a multi-nodal computer system. After saving machine state and arriving at a DUI prompt, the DUI enables an engineer or developer to issue commands, view error logs, view or modify hardware and firmware states, and inject data to avoid problems on subsequent boots. This low-level firmware interface provides such support on a per-cell basis. This enables an engineer or developer to interrupt and debug a problem on a particular cell without impacting performance and function of other cells or the system, treating each cell as a separate "system" for debugging purposes. By providing interrupted debug capabilities on a per-cell level, the rest of the system can continue to boot while an individual cell's resources are debugged.

An early access window into a high-end server system's firmware, before boot completion, is provided by the DUI. The interactive DUI may be available for invocation before core system firmware passes control to adapters or boot handlers. This available window into the boot firmware during the boot process is very helpful; instead of waiting for the entire boot process to complete in order to reach an end user prompt, functionality is selectively available beforehand. A developer or engineer may view or modify the hardware configuration or display information from the firmware interface table (FIT). The interactive DUI may also provide a qualification base for code in development and is very useful for testing code incrementally. For example, test drivers may be run from the DUI prompt in accordance with an embodiment of the invocation systems and methods. From a developer's perspective, the DUI provides access to manipulate source level debugging as well as visibility into and control over data structures and other information the firmware has created in order to boot the cell or system properly. From a support engineer's perspective, the DUI provides an opportunity to deconfigure central processing units (CPU)s, deconfigure memory, take hardware out of the boot process for a cell, or take other corrective action(s), so a cell and ultimately the system can boot.

The DUI allows the user to debug the system, view information or change system configurations. In the default environment for the end customer, the DUI prompt is never reached. However, in the case of lab test or field support, the DUI can be selectively accessed in number of ways. For example, embodiments of the invocation systems and methods provide robust breakpoint settings through firmware NVRAM and/or many potential breaks through an interrupt keystroke.

In accordance with embodiments of the invocation systems and methods, control is passed to a DUI through a breakpoint (bp) command from the DUI. The firmware ROM may be compiled with several optional breakpoints throughout the boot process where a bit is checked in the NVRAM. If that particular bit indicates that the flow control should pass to the DUI then flow control is passed to the DUI at that point. Periodically, the boot firmware for each cell and for the boot firmware for the multi-nodal system polls for breakpoints. These polling points may be set in place at points in the firmware sequence where it might be desirable to examine firmware status and/or to look at the data structures that the firmware has built. So, during system development or diagnostics a number of points where the firmware looks for the interrupt character may be inserted in the cell or system firmware.

Another manner to enter the DUI in accordance with embodiments of the invocation systems and methods is by issuing a break command from the console. This break command may be in the form of a keystroke combination, such as a "Control-C" or a similar keystroke combination. The firmware code may employ a function that polls at different points for this break command keystroke. The firmware code may be compiled into the firmware ROM such that, when an engineer/developer user is booting the system, issuing a break command hands flow control over to the DUI. Specifically, embodiments of the boot firmware interrupt systems and methods employ a firmware interval timer firing periodically, such as every 10 milliseconds. The interrupt timer may check to see if a certain character or the like has been encountered by the console. If the charter has been encountered, then it may cause the boot firmware to a branch into the DUI.

The DUI invocation system and methods may facilitate "time to market" for multi-nodal server class systems by providing a set of tools for developers to accelerate integration of firmware with the rest of the multi-nodal computer system. For example, some DUI functions might be tightly integrated with firmware debugger functions that may be GNU debugger (GDB), a non-Unix™ debugger, or low-level firmware based.

FIG. 1 diagrammatically illustrates hardware layout of multi-nodal, or cellular architecture, computer system 100 adapted to employ interruption of flow control of boot firmware to enable firmware interaction. FIG. 1 also illustrates flow of booting operations of system 100, as well. Individual cells $101_1$ through $101_n$ are shown. Each cell typically consists of multiple processors 102 and its own memory 103. Each cell $101_1$-$101_n$ is typically a computer in its own right. Firmware 104 runs on each cell, until rendezvous, then firmware in a designated "core" cell handles system booting. In various system embodiments each cell is interconnected to backplane 1 15. Crossbar 116, which may be embodied as chips on the backplane, allow each cell to communicate with other cells connected to backplane 115. Each cell has a connection via UART $105_1$-$105_n$, and a port or the like, to console $110_1$-$110_n$ where a developer or engineer can interact with each particular cell, another cell or entire system 100 employing a DUI.

In the boot of system 100, each cell $101_1$-$101_n$ has individual firmware $104_1$-$104_n$ that runs on that cell up to a point, and then at a certain point in the boot process, a core cell, or primary cell, in the system takes over and boots system 100 as a whole. So there are a collection of cells after rendezvous before handing off to OS 120. The core cell handles the boot process after rendezvous and handoff to OS 120. Use of the aforementioned DUI may arise if a break is encountered by boot firmware in a particular cell or in the rendezvoused cell set, prior to handoff to OS 120.

Figure 2:
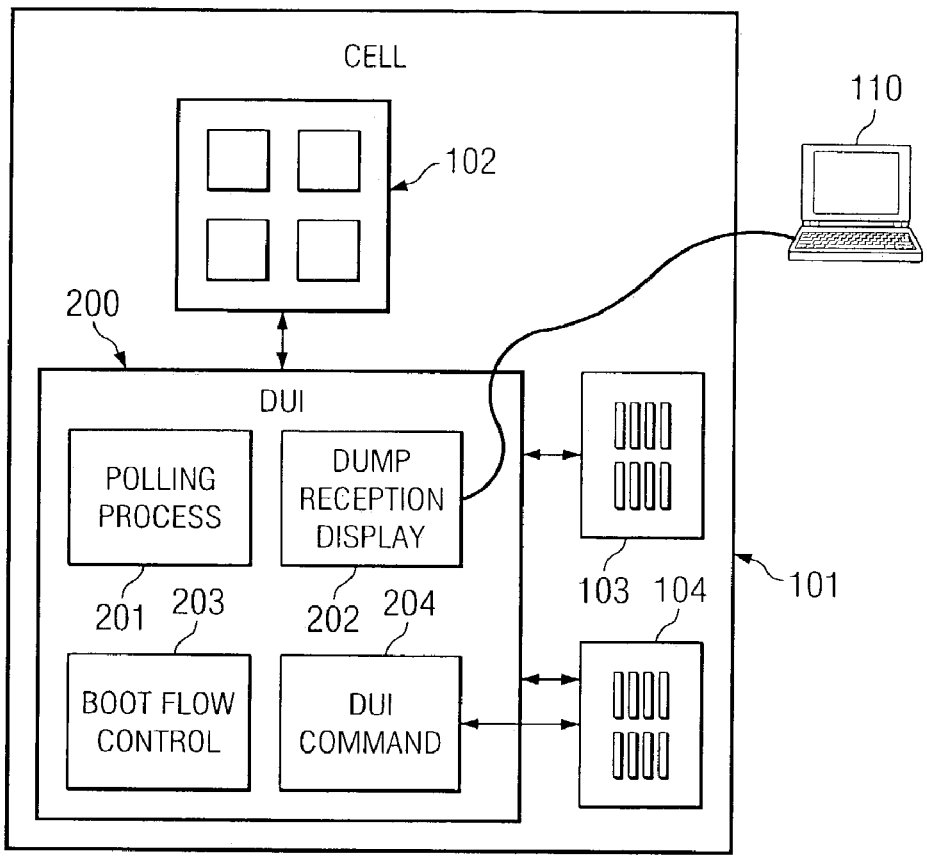
FIG. 2 is a diagrammatic illustration of an embodiment of a developer user interface adopted to interrupt flow control of boot firmware to enable firmware interaction.

FIG. 2 is a diagrammatic illustration of an embodiment of a developer user interface adapted to interrupt flow of boot firmware. Embodiment 200 of a firmware developer user interface for a multi-nodal computer system may employ functionality of processors 102, memory 103 and firmware 104 of cell 101 (i.e., processors $102_1$-$102_n$, memory $103_1$-$103_n$ and firmware $104_1$-$104_n$ of cells $101_1$-$101_n$ of FIG. 1) to provide process 201 for polling for a break command during boot of a multi-nodal computer system. Functionality 202 that enables reception of a dump of a boot process status of at least one cell of the multi-nodal computer system upon encountering a break command is provided by DUI 200. The dump may be displayed on console 101 of system 100 or on a terminal directly or remotely networked to system 100. Flow of boot of at least one cell of the multi-nodal computer system may be controlled by DUI operation 203, and commands 204 may be directed to firmware 104 of at least one cell of the multi-nodal computer system from a console of the multi-nodal system via DUI 200.

Returning to FIG. 1, if, by way of example, cell $101_1$ has a memory error resulting in boot failure, a breakpoint may be inserted by a user, such as an engineer or developer, in the boot process prior to or during initialization of cell memory $103^1$. Alternatively, a user may invoke the DUI by employing a keystroke or keystroke combination prior to or during initialization of cell memory $103_1$. As a result the state of the boot process for that cell would be dumped to the screen of console $110_1$, and control would be handed off to the DUI at console $110_1$ over UART $105_1$. At that point the user may have a capability to interact with cell $101_1$. The user may dump a state of particular components of cell $101_1$; the user may "peek and poke" memory locations at low levels; or attach a debugger, such as GDB, and interact with cell elements to perform source level debugging of firmware $104_1$, for cell $101_1$. If the problem with cell $101_1$ can be addressed at that point, the cell may be put back into the boot process if cells $101_2$-$101_n$, are waiting for cell $101_1$, at a rendezvous point, and system 100 will still boot to OS 120. In the present example, if errant cell $101_1$, is attached to critical resources such as the operating system boot disk or the like, cells $101_2$-$101_n$ would typically wait. Alternatively, cells $101_2$-$101_n$, may boot to OS 120 and cell $101_1$ may be added online at a later time. If further diagnosis is required, the first breakpoint may be removed and/or a second breakpoint may be inserted to allow further initialization of memory $103_1$ to occur to facilitate this further diagnosis.

Until Operating System 120 takes over interrupt servicing, the DUI interactive debug command loop may be invoked in response to a special key sequence being entered. Multiple embodiments Interruption of Flow Control of Boot Firmware to Enable Firmware Interaction may be employed. In one, the UART hardware interrupts on every keystroke input during boot, and a driver filters these keystrokes for a certain interrupt sequence. When the sequence is received, normal processing is suspended, the system state is saved and the processor enters the interactive DUI system.

In some embodiments, a periodic interval timer interrupt is activated and a routine in a DUI interface driver may be invoked to query for the interrupt sequence each time the periodic interval time expires. A specific input sequence, that may be one, two or more specific characters, may trigger the interrupt. When the sequence is detected, and a state transition into the DUI is invoked the system state is saved, so resumption is possible. These embodiments permit interruption of the boot sequence even if no breakpoints have been inserted in the firmware, as for example, in a final product.

Other interrupt-based DUI invocation embodiments are based on the use of an IPF Platform Management Interrupt (PMI) or the like. This interrupt may be non-maskable and under firmware control, even after the OS takes over normal system interrupts. Upon receipt of a PMI interrupt in a processor, instruction processing branches into firmware and remains with the firmware until the firmware resumes execution at the interrupted instruction. These embodiments may be carried out using Platform Abstraction Layer (PAL) firmware functions such as provided in a PAL specification from INTEL™. The DUI system may be placed within the PMI interrupt handler. A PMI may be issued to a processor from a platform manageability subsystem by asserting a specific I/O interrupt controller (IOAPIC) input and having the OS program that IOAPIC to assert the PMI interrupt to a processor of its choosing. PMIs do not branch to the OS in existing IPF systems. These embodiments of the invocation systems and methods enable the DUI to obtain control of an OS-selected processor and branch into the DUI. One of the PMIs, typically level 0, does not require cooperation with the operating system, but merely requires input to a specific input pin on the IPF processor, asserting a PMI signal. IPF OSs may only be able to mask PMI interrupts briefly because masking of PMI prevents interruption handling since processor interrupt collection state is frozen when PMIs are masked.

A breakpoint (bp) DUI command may be used to toggle "breakpoints" for invoking the DUI. This may be used by a firmware developer to take control of the boot process during the system build process. Embodiments of the "bp" command both set and clear breakpoint values in the NVRAM, providing the aforementioned toggling of breakpoints at a location. Valid breakpoint commands may include options or arguments, such as identification of initialization components, CPUs, memory, I/O or crossbar, where interrupt should take place, as well as a clear option. The breakpoint may be set before a specified initialization point. For example, "bp cpus" may be used hand off control to the DUI before the CPUs are added to the boot tree. The DUI may take control before handoff to adapters. At each potential DUI breakpoint, the console should be polled to see if a break command has been entered. If so, the DUI should be invoked at the breakpoint. The poll should be taken of the console universal asynchronous receiver-transmitter (UART) at various steps such that the firmware is not actually interrupted. A poll for character method may be implemented by the UART to support this capability. Embodiments of the invocation systems and methods enable a user to set as many breakpoints as desired. Issuing the "bp" command without any parameters may show current breakpoints. "bp clear" may clear all breakpoints.

Figure 3:
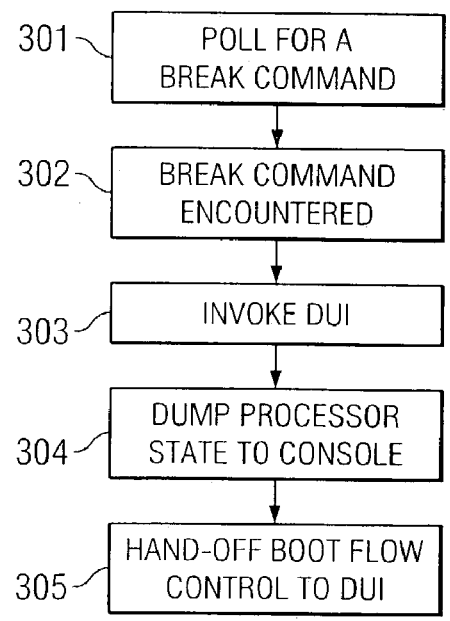
FIG. 3 is a flow chart of an embodiment of a method for invoking a firmware developer user interface.

FIG. 3 is a flow chart of an embodiment of a method for invoking a firmware developer user interface. An embodiment of method 300 for providing a firmware developer user interface in a multi-nodal computer system comprises polling for a break command during boot of a cell of a multi-nodal computer system at 301. The firmware developer user interface is invoked at 303 when the break command is encountered at 302. A processor state for the cell is dumped to a console of the cell at 304, and flow control of boot of the cell is handed-off to the developer user interface at 305.

FIG. 4 is a flowchart of an example multi-nodal system boot 400, showing how firmware may initialize a multi-nodal system and where a DUI may be invoked using breakpoints or an interrupt keystroke. Booting of one cell is shown with other cells 401 joining that cell in boot 400 at rendezvous 402. The system powers on at 403. The CPUs in the cell may be initialized at 405 followed by cell memory initialization 407, and by cell I/O initialization 409. The system crossbars may be initialized at 410 enabling interconnection of the cells. Crossbar initialization 410 typically establishes communication channels between the cell and the crossbar chip(s) that facilitate(s) communication between the other cells. This enables all the cells, at system level, to communicate with each other across the backplane. Once the crossbars are initialized the cells may join at rendezvous 402 and the system is then handed off to the OS at 412.

There are points of interest within boot process 400 where an engineer or developer may wish to have access to a cell or the system. The DUI is particularly useful very early in the boot process such as immediately after the console node is initialized at 422. The DUI is also very useful, immediately before cell rendezvous and immediately before passing control to system adapters responsible for managing a different processor interface available to the OS. A data variable may be used to indicate when the cell's firmware should pass control to the DUI. Thus, embodiments of boot firmware flow control interruption enable the use of breakpoints to enter the DUI. For example, between CPU initialization and memory initialization may be an interesting point to obtain control of boot process 400, before memory initialization to deconfigure a portion of memory.

FIG. 4 is a high level diagram showing access before major component initialization where the cell polls (415) for a breakpoint or a boot interrupt keystroke. Initiation of the DUI at any of these polling points will enable an engineer or developer to either see the state of the cell as it is booted to this point, or to effect the state of the boot after the breakpoint.

The DUI breakpoint command may set a flag in firmware NVRAM to initiate a break and give control to the DUI, on the cell console, during each subsequent boot at the selected point. The NVRAM is persistent across boots. It does not lose its state on power off. On subsequent boots, the firmware boot process reads NVRAM, carrying out polling 415, 420 and 425, and determines whether it needs to stop at some point or not. So all subsequent boots could stop at (a) selected point(s). In this manner, there is no need to rely on a user making a keystroke, or keystroke combination at a certain point in order to stop at that point in the boot process. Multiple breakpoints may be set in accordance with embodiments of the invocation systems and methods.

Power up 403, CPU initialization 405, memory initialization 407, I/O initialization 409 and crossbar initialization 410 are all related to a particular cell's boot process. So if a break is initiated at polling points 415 between any of these events, there is no effect on booting of other cells. Work may be carried out, such as debugging on the interrupted cell, with no affect on the state or operation of the other cells 401. A breakpoint or a boot interrupt keystroke at polling point 420, after crossbar initialization 410, but before rendezvous 402 may enable access to any of the cells from one console. After all the cells have rendezvoused, a breakpoint or a boot interrupt keystroke at polling point 425 may enable access to all or any of the cells in the system, as well as to the system itself, before handing-off the system to the operating system at 412.

Breakpoints to initialize the DUI may be set not only between boot steps such as the above-described initializations, but also during such steps. For example, in memory initialization step 407, after a particular memory controller has been initialized with the first few commands of a setup command, a breakpoint may be used to access the DUI before the next set of memory control initialization commands.

In a multi-nodal system, the firmware within each cell may have several components, for example, a component that handles different CPU processes and initialization, a memory process initialization component, an I/O process initialization component and the like. These components include a firmware interface table (FIT) table that provides memory locations, essentially hard coded memory locations to where control may pass. So during the boot process if the CPU initialization component determines that it needs to hand control off to the DUI, the CPU initialization component looks up the address of the DUI in the FIT table and branches to that address. The DUI then takes control and waits for feedback from the technician/developer user.

The DUI may act as a shell prompt, similar to a DOS prompt or the like, querying the user via the console for commands. The DUI has a set of commands that it uses and may employ a help command that lists available commands. The DUI may also have a reset command so that the user is able to reset the system from the DUI prompt. The scope of where the DUI is accessed may determine whether it may reset cell or the system. If the DUI is accessed during cell initialization for a particular cell, it may reset that cell. If the DUI is accessed after cell rendezvous, it may be able to reset the entire multi-nodal system.

What is claimed is:

1. A method for providing a firmware developer user interface in a multi-nodal computer system, said method comprising:
   polling for a break command during boot of a multi-nodal computer system; and
   invoking a firmware developer user interface when said break command is encountered.

2. The method of a claim 1 wherein said break command comprises an interrupt keystroke entered on a console of said multi-nodal computer system.

3. The method of a claim 1 wherein said break command comprises an interrupt keystroke combination entered on a console of said multi-nodal computer system.

4. The method of a claim 1 wherein said break command comprises a breakpoint set in boot firmware nonvolatile random access memory of said multi-nodal computer system.

5. The method of claim 1 wherein said polling and said invoking take place within a cell of said multi-nodal computer system.

6. The method of claim 1 wherein said polling further comprises polling for said break command between component initializations of said boot.

7. The method of claim 1 wherein said polling further comprises polling for said break command during component initializations of said boot.

8. The method of claim 1 further comprising dumping a processor state for said multi-nodal computer system to a console of said multi-nodal computer system.

9. The method of claim 1 further comprising handing-off flow control of said boot of said multi-nodal computer system to said developer user interface.

10. The method of claim 1 wherein said boot comprises component initializations comprising at least one initialization selected from a group of initializations consisting of:
    system power up;
    cell power up;
    central processing unit initialization;
    memory initialization;
    input/output initialization; and
    crossbar initialization.

11. A firmware developer user interface for a multi-nodal computer system comprising:
    means for polling for a break command during boot of a multi-nodal computer system;
    means for receiving a dump of a boot process status of at least one cell of said multi-nodal computer system upon encountering a break command;
    means for displaying said dump on a console of said multi-nodal computer system;
    means for controlling flow of said boot of at least one cell of said multi-nodal computer system; and
    means for directing commands for changing system configuration to firmware of at least one cell of said multi-nodal computer system from said console of said multi-nodal computer system.

12. The firmware developer user interface of claim 11 wherein said polling means comprises means for polling for a break command between component initializations during boot of at least one cell of said multi-nodal computer system, said break command invoking said firmware developer user interface.

13. The firmware developer user interface of claim 11 wherein said polling means comprises means for polling for a break command during boot component initializations of at least one cell of said multi-nodal computer system, said break command invoking said firmware developer user interface.

14. The firmware developer user interface of claim 11 wherein said break command comprises an interrupt keystroke entered on said console of said multi-nodal computer system.

15. The firmware developer user interface of claim 11 wherein said break command comprises an interrupt keystroke combination entered on said console of said multi-nodal computer system.

16. The firmware developer user interface claim 11 wherein said break command comprises a breakpoint set in boot firmware nonvolatile random access memory of said multi-nodal computer system.

17. The firmware developer user interface of claim 11 wherein said boot is boot of a cell of said multi-nodal computer system.

18. The firmware developer user interface of claim 11 wherein said boot comprises component initializations, comprising at least one initialization selected from a group of initializations consisting of:
    system power up;
    cell power up;
    central processing unit initialization;
    memory initialization;
    input/output initialization; and
    crossbar initialization.

19. The firmware developer user interface of claim 11 where said means for controlling flow of said boot of at least one cell of said multi-nodal computer system operates while at least one other cell of said multi-nodal computer system continues boot.

20. A method for providing a firmware developer user interface in a multi-nodal computer system, said method comprising:
    polling for a break command during boot of a cell of a multi-nodal computer system;
    invoking a finnware developer user interface when said break command is encountered;
    dumping a processor state for said cell to a console of said cell;
    handing off flow control of said boot of said cell to said developer user interface; and
    directing commands for changing system configuration to said firmware developer interface.

21. The method of a claim 20 wherein said break command comprises a breakpoint set in boot firmware nonvolatile random access memory of said cell.

22. The method of a claim 20 wherein said break command comprises a keystroke entered on said console of said cell.

23. The method of a claim 20 wherein said break command comprises a keystroke combination entered on said console of said cell.

24. The method of claim 20 wherein said polling further comprises polling for said break command between component initializations of said boot of said cell.

25. The method of claim 20 wherein said polling further comprises polling for said break command during component initializations of said boot of said cell.

26. The method of claim 20 wherein said boot of said cell comprises component initializations, said component initializations comprising at least one component initialization selected from a group of component initializations consisting of:
 system power up;
 cell power up;
 central processing unit initialization;
 memory initialization;
 input/output initialization; and
 crossbar initialization.

* * * * *

UNITED STATES PATENT AND TRADEMARK OFFICE
CERTIFICATE OF CORRECTION

PATENT NO. : 7,386,712 B2
APPLICATION NO. : 10/369279
DATED : June 10, 2008
INVENTOR(S) : Jason W. Reasor et al.

It is certified that error appears in the above-identified patent and that said Letters Patent is hereby corrected as shown below:

In column 2, line 2, delete "Lip" and insert -- up --, therefor.

In column 5, line 27, delete "1 15" and insert -- 115 --, therefor.

In column 5, line 67, delete "$103^1$" and insert -- $103_1$ --, therefor.

In column 9, line 13, in Claim 2, after "method of" delete "a".

In column 9, line 16, in Claim 3, after "method of" delete "a".

In column 9, line 19, in Claim 4, after "method of" delete "a".

In column 10, line 15, in Claim 16, after "interface" insert -- of --.

In column 10, line 43, in Claim 20, delete "finnware" and insert -- firmware --, therefor.

In column 10, line 51, in Claim 21, after "method of" delete "a".

In column 10, line 54, in Claim 22, after "method of" delete "a".

In column 10, line 57, in Claim 23, after "method of" delete "a".

Signed and Sealed this

Seventh Day of October, 2008

JON W. DUDAS
*Director of the United States Patent and Trademark Office*